March 8, 1966  C. D. WILLIAMS  3,238,709
FLOAT AND ADJUSTING MECHANISM
Filed Oct. 5, 1964  2 Sheets-Sheet 1

INVENTOR.
C. D. WILLIAMS

March 8, 1966  C. D. WILLIAMS  3,238,709
FLOAT AND ADJUSTING MECHANISM
Filed Oct. 5, 1964  2 Sheets-Sheet 2

INVENTOR.
C. D. WILLIAMS

United States Patent Office 3,238,709
Patented Mar. 8, 1966

3,238,709
FLOAT AND ADJUSTING MECHANISM
Carl D. Williams, 807 Sherman Ave., Corcoran, Calif.
Filed Oct. 5, 1964, Ser. No. 401,550
11 Claims. (Cl. 56—208)

This invention relates to a float and adjusting mechanism and more particularly to such mechanism as finds special utility in the mounting, supporting and adjustment of, for example, the header on an agricultural combine.

In a machine of this character, the basic vehicular part of the combine is regarded as a self-propelled or mobile frame, from which a header extends forwardly, carrying the usual harvesting mechanism. The mounting of the header on the combine is effected by a transverse horizontal pivot axis about which the header is vertically adjustable, usually by one or more force-exerting devices, such as hydraulic cylinder and piston assemblies, connected between a lower supporting portion of the frame and the under forward side of the header.

A combine very often operates under conditions in which the header, and therefore the cutting mechanism, travels relatively close to the ground in order to gather and harvest low-lying crops, such as soybeans and the like. Because of this, the cutting mechanism often encounters hummocks and depressions in the ground, causing the header to bounce and at times to dig into the ground. Various forms of relatively complicated devices have been provided for the purpose of detecting ground variations in advance and signalling these conditions to hydraulically or electrically operated devices which will function to adjust the header far enough in advance of the adverse condition so as to correct its attitude. These devices, however, are quite expensive and, being complicated are troublesome and require frequent adjustment and repair.

According to the present invention, an improved mechanism has been made for floating and adjusting the header without the need for resort to automatic sensing and power-operated means. It is therefore a principal object of the invention to provide an improved and simplified float and adjusting mechanism particularly adapted for use between the supporting structure and header of a combine; although, the invention will find utility in like situations.

It is a further object to provide the float and adjusting mechanism in the form of a unit in which the force-exerting devices and spring means function in series as distinguished from the usual counterbalance spring arrangement common to many agricultural implements. A still further object resides in the provision of a unit made up of a plurality of members, one of which is connectible to the header, another of which is connected to the force-exerting devices which are in turn connected to the combine frame, and two other members, one of which is connected to spring means which in turn are connected to the above member that attaches to the force exerting devices and the other of which is connected to the springs and guided on the first member.

It is a still further object of the invention to provide an inexpensive, uncomplicated float and adjusting mechanism that may be produced as a relatively compact and low-cost unit capable of being built into current machines or provided as an attachment for existing machines.

The foregoing and other important objects and desirable features inherent in and encompassed by the invention will become apparent as a preferred embodiment thereof is disclosed, by way of example, in the ensuing description and accompanying sheets of drawings, the figures of which are described below.

As previously indicated, the invention finds particular utility in an agricultural combine and especially in mounting, floating and adjusting the combine header. It will be clear, of course, that equivalent machines having equivalent problems may well benefit from exploitation of the invention. Therefore, the present description is illustrative and not limiting. Likewise, the use in the description, as well as in the claims, of such expressions as "fore and aft," "front," "rear" etc. are used by way of convenience, it being obvious that the parts could have other geographical characteristics.

Figure 5:
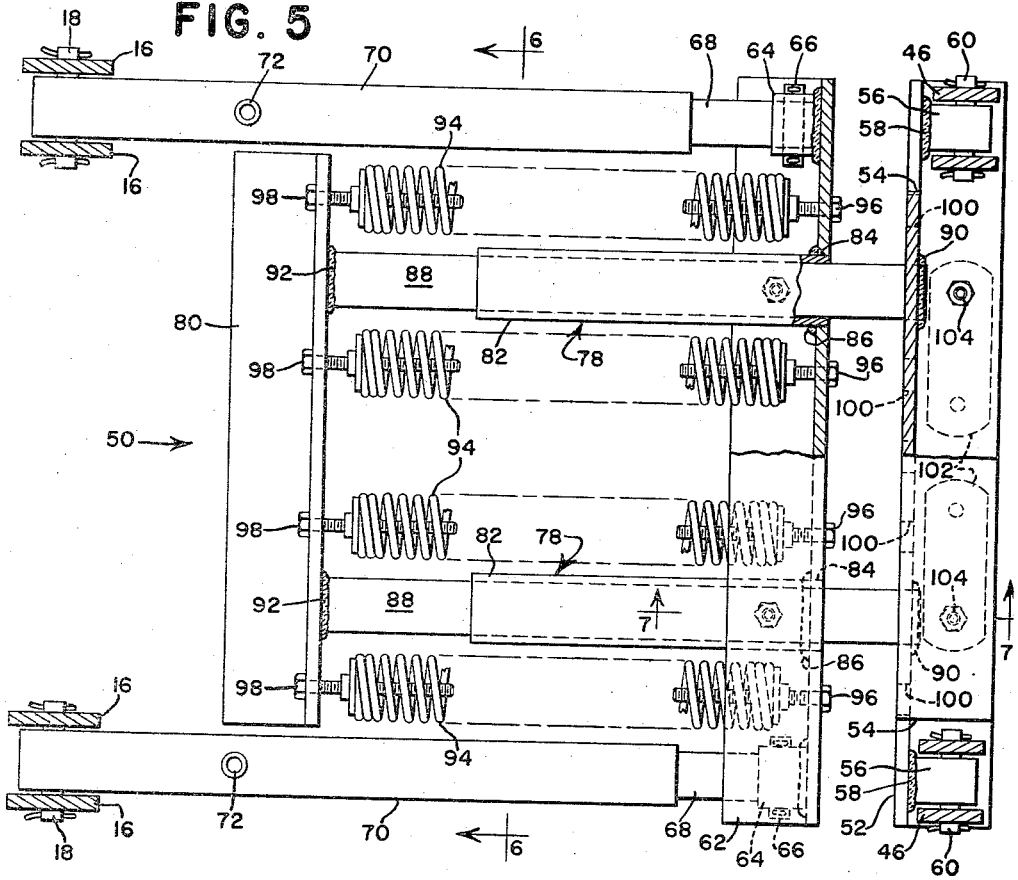
FIG. 5 is an enlarged plan view, with portions broken away and shown in section, of the float and adjusting mechanism as seen generally along the line 5—5 of FIG. 1.

The combine chosen for purposes of illustration has a main fore-and-aft mobile frame 10 provided with a transverse front axle structure 12 including transversely spaced apart front traction wheels 14, only one of which is shown. Rigidly depending from the axle structure 12 is a pair of transversely spaced apart lower supports 16, each comprising a pair of transversely apertured ears capable of receiving a connecting pin 18 (FIG. 5).

Spaced above the lower support means 16 as well as above the transverse axle structure 12 is upper support means made up of a pair of laterally spaced brackets, only one of which is shown at 20. That there are two of these will be clear to those versed in the art, since the arrangement is typical of the conventional combine header mounting. The combine header, designated in its entirety by the numeral 22 includes a forward platform 24 and a feeder house 26 extending rearwardly from the platform to dispose its rear end into crop-delivery relationship to the frame or body 10 within which is contained the usual separating mechanism (not shown). The rear end of the feeder house 26 has a transverse support 28 which is receivable by the trunnions or brackets 20, being confined at each end by a removable pin 30. This again is conventional construction. The arrangement is such that the supporting structure 20–28 affords a transverse horizontal pivot about which the header 22 is vertically adjustable to vary its relationship to the ground and therefore to vary the height of cut of the cutting mechanism, portions of which are visible at 32.

From the description thus far, it will be seen that the header extends forwardly from the upper support 20 in overhanging relationship to the lower supports 16. The header is a relatively heavy element which cannot be allowed to ride entirely on the ground surface; although, some ground support is lent thereto by the provision of a plurality of skids 34 spaced apart across the platform which, as is known to those versed in the art, is relatively transversely elongated. Each skid 34 is vertically adjustable relative to the bottom of the platform so as to gauge the height of the cutting mechanism 32 above the ground. In the construction shown, the platform includes a fore-and-aft angle 36 to which is secured an L-shaped bracket 38, as by a bolt and nut assembly 40, and adjustability between the skid 34 and the lower flange of the bracket 38 is effected by a plurality of shims 42, which may be conveniently added or subtracted by means of being stacked and unstacked on a bolt 44 that extends through the skid, through the shims and through the lower flange on the bracket 38.

It is known practice to support a header in the manner described above, with or without skids such as those shown at 34, and to position the header relative to the ground by some form of force-exerting means connected between the lower supports 16 on the axle 12 and mounting means on the underside of the header, such as those shown at 46. In a typical construction, a pair of hydraulic cylinder and piston assemblies will be used in this location, these assemblies being suitably hydraulically actuated so as to extend to effect raising of the header and to retract to enable lowering of the header by gravity. In the present illustration, an operator's station is shown at 48, and the cylinder and piston assembly controls, as well as others, will be conveniently grouped here. The foregoing is referred to only for purposes of orientation and to explain the prior art so far as concerns the means for effecting vertical adjustment of the header 22 about the pivot 28.

Because of the deficiencies noted above, a simple mounting of this character is not acceptable in all conditions. Either the hydraulic control for the conventional cylinder and piston assemblies must be supplemented by an automatic sensing device or the header must be otherwise supported. The present invention, as already pointed out, relates to a simplified alternative means for supporting the header as distinguished from resort to the automatic systems previously described.

Figure 6:
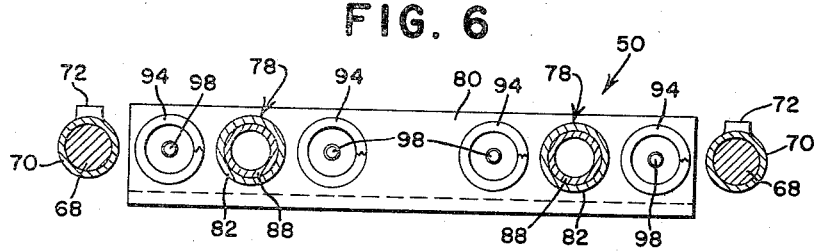
FIG. 6 is a transverse section as seen along the line 6—6 of FIG. 5.
Figure 7:
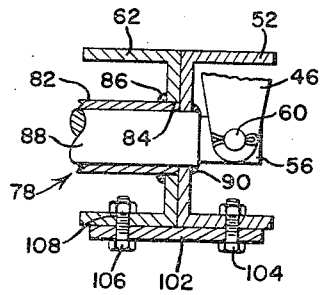
FIG. 7 is a section as would be seen along the line 7—7 of FIG. 5 if the two right-hand members were in contact, this view illustrating a locking means for rigidifying the unit for transport purposes.

The improved mechanism is designated in its entirety by the numeral 50. It is best shown in FIGS. 5 and 6 with relation to its own components and in FIG. 1 relative to the machine or combine components. In this respect, it should be noted that the unit may be furnished in several conditions of assembly. In some instances, many of the combine parts may be exploited. In other conditions, the unit may be self-contained and intended to replace the usual cylinder and piston assemblies. The unit is capable of being furnished in many size and types and with different numbers of guides, springs etc., according to the nature of the load it is expected to sustain. These and other variations will readily occur on the basis of the detailed disclosure to follow.

Fundamentally, the unit may be provided as original equipment or as an attachment, being used in place of the simple cylinder and piston assemblies referred to above. However, as indicated, the original cylinder and piston assemblies may be employed with the unit instead of additional assemblies furnished with the unit.

Figure 1:
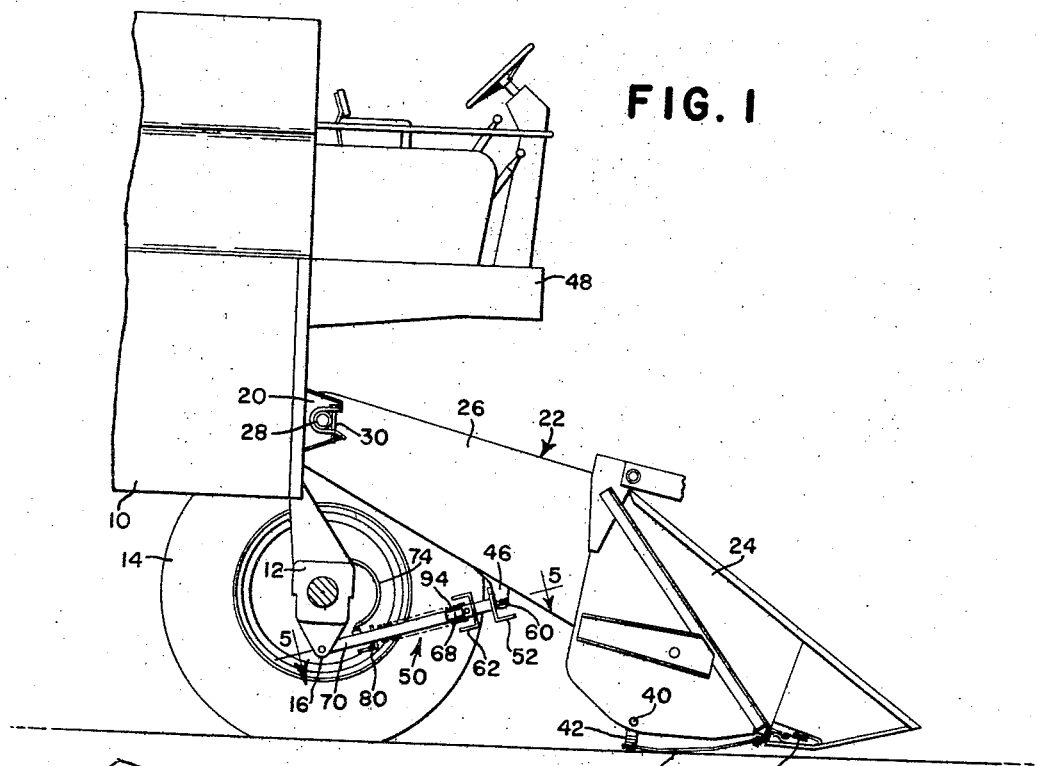
FIG. 1 is a side elevational view of the forward portion of a representative combine, with portions omitted and other portions broken away and shown in section.
Figure 2:
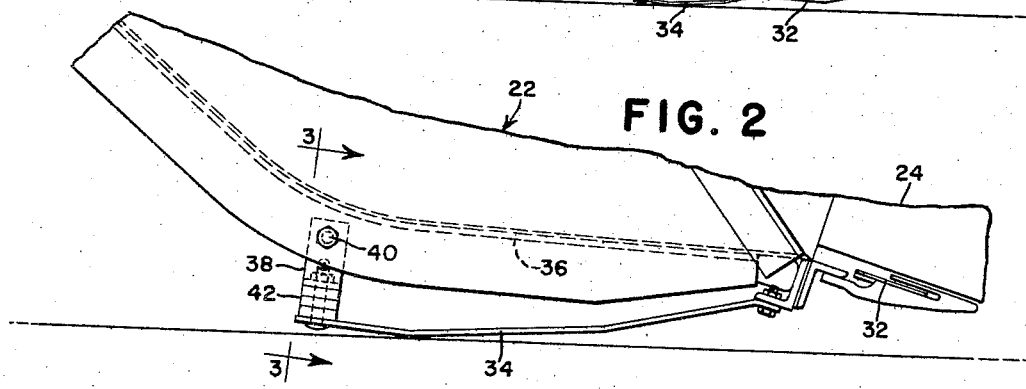
FIG. 2 is an enlarged fragmentary view of a lower portion of the header, showing a ground-engaging skid.
Figure 3:
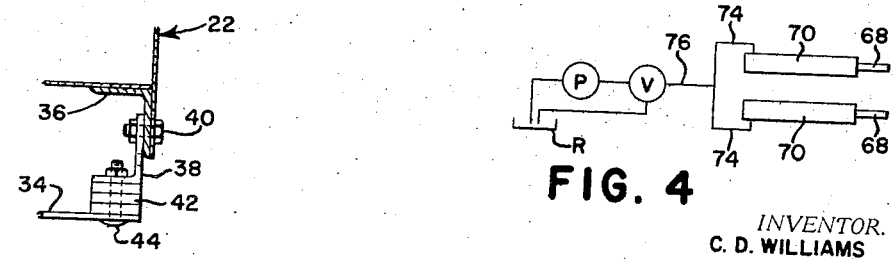
FIG. 3 is a section on the line 3—3 of FIG. 2.

The unit has a transversely elongated front member 52, here in the form of a forwardly facing channel, end portions of which have been cut away at 54 to accommodate mounting ears 56, welded thereto as at 58 and transversely apertured to receive removable mounting pins 60 for connecting the ears 56 respectively to the depending ears of the mounting means 46 at the underside of a forward portion of the header 22 (FIG. 1).

Figure 4:
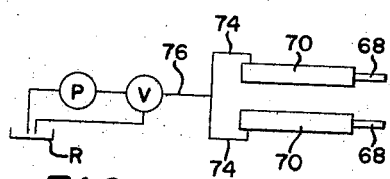
FIG. 4 is a schematic diagram of a typical hydraulic circuit used to control the conventional force-exerting devices.

A transversely elongated intermediate member 62, in the form of a rearwardly facing channel, is parallel to and disposed closely behind (in operation) the front member or channel 52. The members 52 and 62 may be substantially coextensive in length. Each of the opposite ends of the intermediate member 62 is provided with a rearwardly facing socket 64, transversely apertured to receive a mounting pin 66. Each socket receives therein the forward end of a piston rod 68 of a cylinder and piston assembly, the cylinder of which is designated by the numeral 70, and the rear end of each cylinder is provided with means for connection to the lower support ears 16 by means of the previously described pin 18. In a cylinder-piston assembly of the type shown at 68–70, the piston is merely the inner part of the piston rod 68, and fluid is transmitted to and exhausted from the assembly by means of a fitting 72 to which a fluid line may be connected, as suggested at 74 in FIGS. 1 and 4. As shown in FIG. 4, the lines 74 are connected in parallel as at 76 and this line leads to a valve V which controls the fluid pressure supply delivered by a pump P for effecting extenison and retraction of the assemblies 68–70. In a conventional machine, the pump is driven from any suitable rotating part powered in the first instance from an internal combustion engine (not show), for example. These details are broadly insignificant here and the description resorted to is for the purpose of orientation and general explanation. The pump and valve are appropriately associated with a reservoir as shown at R.

From the description thus far, and without more, it will be seen that extension of the assemblies 68–70 will move the intermediate member 62 toward and in contact with the front member 52, abutting same and therefore exerting a lifting force on the header 22. This would be but a duplication of the typical lifting arrangement. Instead, however, the present invention provides the intermediary of spring means in series with the lifting force exerted by the assemblies 68–70 and, during operation, there is no lifting contact between the members 52 and 62.

To accomplish the desired purpose, the intermediate member carries, via fore-and-aft guide means 78, a transverse rear member 80 which parallels the two members 52 and 62 but which is spaced rearwardly therefrom in general proximity to the lower front supports 16. Each guide means 78 comprises a fore-and-aft tubular member 82 having its forward end coaxially received in a circular aperture 84 in the vertical flange of the intermediate member 62. The tubular part is welded at this location as shown at 86 and extends rearwardly therefrom to a terminal rear end short of the front flange of the rear member 80 which is in the form of an angle member.

Each guide means 78 further includes a fore-and-aft elongated guided part 88, slidably received by its tube 82 and extending at both its front and rear ends beyond the front and rear ends respectively of its tube. The front end of each guided part 88 is connected as by welding at 90 to the vertical flange of the front member 52 and its rear end is connected by welding as at 92 to the front face of the upright flange of the rear angle or member 80. Thus, the front and rear members 52 and 80 are interconnected by the guided parts 88 and the assembly 52–80–88 is slidably supported on the intermediate member 62 via the guide means tubes 82. A compact organization of parts is accomplished by disposing the members 52, 62 and 80 in a common plane which, in the installation of the unit, is transverse and generally fore and aft. Since the transverse length of the rear member 80 is shorter than that of the intermediate member 62, the cylinder and piston assemblies 68–70 may lie respectively alongside and extending rearwardly beyond opposite ends of the rear member 80. The guide means 78 are located so that they are interiorly of the assemblies 68–70, respectively, as respects lateral disposition.

The mechanism is completed by the provision of a plurality of spring means 94 extending between the intermediate and rear members 62 and 80. Each spring is a tension spring, connected at its forward end by an adjusting screw 96 to the upright flange of the intermediate member 62 and having its rear end connected by an adjusting screw 98 to the upright flange of the rear member 80. The springs exert forward forces on the rear member 80 and these forces are transmitted to the front member 52, and thus to the header 22, by means of the struts establishd by the guided parts 88. Therefore, when fluid under pressure is supplied to the cylinder and piston assemblies 68–70, extending same, the forward force exerted on the intermediate member 62 is transmitted via the springs 94 to the rear member 80 and this in turn, as previously said, exerts a forward force on the member 52. Since this member is connected to the header by the mounting means 46, the result is the exertion of a lifting force on the header.

Now, should the header encounter a rise in the ground, it will be easily raised over this rise without causing the cutting mechanism to dig in, because the springs 94 will be exerting a lifting force. That is to say, as soon as the header starts to rise, the springs will assist the rise. As the header passes over the rise and tends to return to its originally set position, the tension springs will return to their original load-carrying condition. It will be understood, of course, that the parts 88 slide in the tubes 82 without causing the pistons 68 to move outwardly and inwardly of the respective cylinders 70. In practice, it is preferred that the cylinders, by means of the valve V, be contracted an additional amount after the platform skids 34 contact the ground.

In normal operation, the amount of spring tension as adjusted by the adjusting screws 96–98 may be varied to vary the gap between the upright flanges of the front and intermediate members 52 and 62 and thereby vary the amount of float that the springs will give. This in turn is related to the amount of weight of the header carried on the ground via the skids 34. For example, the springs 94 may be adjusted so tightly as to sustain substantially all the weight of the header. This is not a desirable condition. Part of the weight of the header will be carried on the ground via the skids and part by the springs. An operator readily learns the proper adjustment and, by varying the gap between the members 52 and 62 he can vary the interval between engagement and non-engagement of these members. When properly adjusted, the cylinder-piston assemblies 68–70 can be extended to raise the header clear of the ground and the members 52 and 62 should abut. Such condition will obtain when it is desired to transport the machine without encountering bouncing of the header, at which time the members 52 and 62 may be locked together.

The rear upright flange of the front member 52 may be apertured at 100 to accommodate the heads of the adjusting screws 96. When the two members 52 and 62 are abutting, as by the action described above, they are locked together by a pair of pivoted straps 102, normally carried by the member 52 by means of bolts 104 and lockable to the member 62 by additional bolts 106 when swung from the positions of FIG. 5 to that of FIG. 6. It will be clear, of course, that the bolts 106 may be normally carried in place in the lower flange of the member 62 via suitable apertures 108 therein, and that these bolts, as well as the bolts 104 may be loosened and/or removed for the purpose of effecting the locking function. Conversely, when the locking straps are removed, necessary loosening and/or removal as respects the bolts may be easily accomplished.

For accommodating variations in ground terrain and in different crop conditions, the user may adjust the mechanism to his satisfaction by a combination of adjustments of the springs 94 to get the proper support of the header 22 on the ground and of the skids 34 via the shims 42 so as to get the desired cutting height. When the proper adjustments have been obtained the control valve V for the cylinder piston assemblies 68 and 70 may be moved to its exhaust or discharge position, in various degrees, so as to release fluid from the cylinders to provide for down float as well as to further vary the load supported by the skids.

Various features and advantages, as well as changes in structure, will occur to those versed in the art, as will many modifications and alterations in the preferred embodiment of the invention illustrated and described, all without departure from the spirit and scope of the invention.

What is claimed is:

1. For a ground-traversing machine having a mobile frame adapted to advance over the ground and including spaced apart upper and lower supports, and a relatively heavy element carried by the upper support on a transverse pivot axis and extending forwardly in overhanging relation to the lower support and including mounting means spaced ahead of the supports, the improvement residing in a float and adjusting mechanism for the element, comprising: a front member having means for connection to the mounting means; an intermediate member behind the front member; a rear member proximate to the lower support; guide means including a fore-and-aft guide part secured to the intermediate member and a fore-and-aft guided part slidably carried by the guide part and connected at opposite ends respectively to the front and rear members; spring means connected between the rear and intermediate members and exerting a forward force on the rear member; and fore-and-aft adjustable force-exerting means having a forward portion connected to the intermediate member and a rearward portion including means for connection to the lower support and operative to exert a lifting force on the intermediate member.

2. The invention defined in claim 1, including: means for selectively locking the front and intermediate members together.

3. The invention defined in claim 1, including: skid means having means for connection to the element to sustain a forward portion of the element from the ground.

4. The invention defined in claim 3, in which: the skid means is vertically adjustable relative to the element.

5. The invention defined in claim 1, in which: the spring means, the guide means and the force-exerting means lie side by side in a transverse generally fore-and-aft plane.

6. The invention defined in claim 1, in which: the intermediate member has a fore-and-aft aperture therein, the guide part is tubular and in register with said aperture and the guided part passes slidably through the tubular guide part and aperture.

7. For a ground-traversing machine having a mobile frame adapted to advance over the ground and including spaced apart upper and lower supports, and a relatively heavy element carried by the upper support on a transverse pivot axis and extending forwardly in overhanging relation to the lower support and including mounting means spaced ahead of the supports, the improvement residing in a float and adjusting mechanism for the element, comprising: a transversely elongated front member having means for connection to the mounting means; a transversely elongated intermediate member parallel to and closely spaced behind the front member; a transversely elongated rear member parallel to the intermediate member and spaced rearwardly therefrom in proximity to the lower support; guide means including a plurality of transversely spaced apart fore-and-aft guide parts secured to the intermediate member and extending rearwardly toward but short of the rear member and a like plurality of fore-and-aft guided parts slidably carried respectively by the guide parts and having front and rear ends connected respectively to the front and rear members; a plurality of fore-and-aft tension springs connected at opposite ends respectively to the intermediate and rear members; and a plurality of fore-and-aft adjustable force-exerting means having forward portions connected to the intermediate member and rearward portions including means for connection to the lower support and operative to exert a lifting force on the intermediate member.

8. The invention defined in claim 7, in which: a pair of spring means flanks each guide means and the force-exerting means lie laterally outwardly of the outermost spring means, all of said guide means, spring means and force-exerting means lying in side-by-side relation in a transverse generally fore-and-aft plane.

9. The invention defined in claim 7, in which: the intermediate member is longer than the rear member and has opposite end portions projecting laterally outwardly beyond corresponding end portions of the rear member, and the fore-exerting means have their forward portions connected respectively to said intermediate member end portions and have their rear portions respectively laterally outwardly of and extending rearwardly past the rear member end portions.

10. For a ground-traversing machine having a mobile frame adapted to advance over the ground and including spaced apart upper and lower supports, and a relatively heavy element carried by the upper support on a transverse pivot axis and extending forwardly in overhanging relation to the lower support and including mounting means spaced ahead of the supports, the improvement residing in a float and adjusting mechanism for the element, comprising: spring means having front and rear portions; means for connection of one of said portions to the element mounting means; and adjustable force-exerting means operative selectively in lifting and lowering directions and having a first part including means for connection to the lower support means and a second relatively movable part having a force-applying connection to the other portion of the spring means exclusively of the mounting means so that the spring means is serially interposed between said mounting means and said second part whereby said element is floatingly supported by the spring means and whereby the force-exerting means, when its parts are moved relatively in a lifting direction, and is operative to load the spring means so as to cause the spring means to thereupon exert a lifting force on the element.

11. For a ground-traversing machine having a mobile frame adapted to advance over the ground and including spaced apart upper and lower supports, and a relatively heavy element carried by the upper support on a transverse pivot axis and extending forwardly in overhanging relation to the lower support and including mounting means spaced ahead of the supports, the improvement residing in a float mechanism for the element, comprising: a front member having means for connection to the mounting means; an intermediate member behind the front member and having means for connection to the lower support; a rear member proximate to the lower support; guide means including a fore-and-aft guide part secured to the intermediate member and a fore-and-aft guided part slidably carried by the guide part and connected at opposite ends respectively to the front and rear members; and spring means connected between the rear and intermediate members and exerting a forward force on the rear member for exerting a lifting force on the element via the guided part and the front member.

References Cited by the Examiner

UNITED STATES PATENTS 2,452,153  10/1948  Ronning et al. _____ 56–208

FOREIGN PATENTS 1,319,825  1/1963  France.
  111,221  7/1944  Sweden.

ABRAHAM G. STONE, *Primary Examiner.*

RUSSELL R. KINSEY, *Examiner.*

M. C. PAYDEN, *Assistant Examiner.*